United States Patent [19]
Touchstone

[11] 3,994,077
[45] Nov. 30, 1976

[54] TAXIDERMY FORM
[76] Inventor: Sam F. Touchstone, Rte. 1, Bossier City, La. 71010
[22] Filed: Jan. 12, 1976
[21] Appl. No.: 648,096

[52] U.S. Cl. .................................................. 35/20
[51] Int. Cl.² ...................................... G09B 23/36
[58] Field of Search ..................... 35/20; 223/66, 68

[56] References Cited
UNITED STATES PATENTS

| | | | |
|---|---|---|---|
| 1,174,455 | 3/1916 | Stetten | 223/66 X |
| 2,831,271 | 4/1958 | Stitt | 35/20 |
| 3,462,050 | 8/1969 | Hensley | 223/66 |

OTHER PUBLICATIONS
Smithsonian Publication SII-73 9/56, rec'd June 1961, "Sculpture-Taxidermy Procedure for Making Manikins of Haired Animals and Large Birds".

Primary Examiner—Harland S. Skogquist

[57] ABSTRACT

A taxidermy form including at least two sections and apparatus for joining the sections, which includes a pair of facing plates for each of the sections which plates are securely fitted into the cavity of each section and are joined by wood screws or an alternative fastening means as the sections are fitted together.

10 Claims, 2 Drawing Figures

TAXIDERMY FORM

BACKGROUND OF THE INVENTION

1. Field of the Invention

This invention relates to the taxidermy business, and more particularly, to taxidermy forms having at least two sections and an apparatus for joining the sections. The forms include substrates for mounting and preserving the hides, skins and heads of animals.

2. Description of the Prior Art

Forms for mounting animal hides, skins and heads have been used in the taxidermy business for many years. Generally, such forms are molded in one piece and are typically formed to approximate the shape of the animal in order to provide a base over which the skin or hide of the animal may be fitted to form a lifelike mount. The forms are typically made of styrofoam or expanded polyurethane, and may be solid or hollow, depending upon size. Such forms are well suited for smaller mounts such as squirrels, birds, rabbits, deer heads and the like, but when it is desired to mount a larger animal such as an entire deer, or bear, problems are encountered in the mounting operation because of the size of the animal. Other problems such as crating and moving both the forms and the mounted animal are presented, which problems are magnified as the size of the form increases.

Accordingly, it is frequently desirable to mount such larger animals in two or more sections which may be secured during or after the mounting process in order to achieve a lifelike mount and to facilitate ease of mounting. A significant problem, however, is presented as to how these sections may be fitted together so as to preserve the natural contour of the form and present a suitable surface upon which the mating edges of skin or hide can be joined in a non-apparent seam.

Accordingly, it is an object of this invention to provide a taxidermy form having at least two sections and a means for joining the sections, which combination permits easy assembly and disassembly for convenient shipping and storage.

Another object of the invention is to provide a taxidermy form and joining apparatus for mounting animals which includes placing a pair of matching and facing plates in the sections to be joined and removably securing the sections together with clamps, bolts or screws by joining the plates.

Yet another object of the invention is to provide an improved form for mounting animals, including fish and birds, which includes an apparatus for joining two or more sections of the forms by providing a plate in each section and joining the plates by means of screws or alternative means.

SUMMARY OF THE INVENTION

These and other objects of the invention are provided in a taxidermy form having at least two distinct sections and an apparatus for joining these sections which apparatus includes a plate mounted in each section, each plate of which is adapted to be removably secured to the other by screws or other fastening means as the sections are fitted together.

BRIEF DESCRIPTION OF THE DRAWING

The invention will be better understood in view of the following description presented with reference to the accompanying drawing.

DESCRIPTION OF THE PREFERRED EMBODIMENTS

Figure 1:
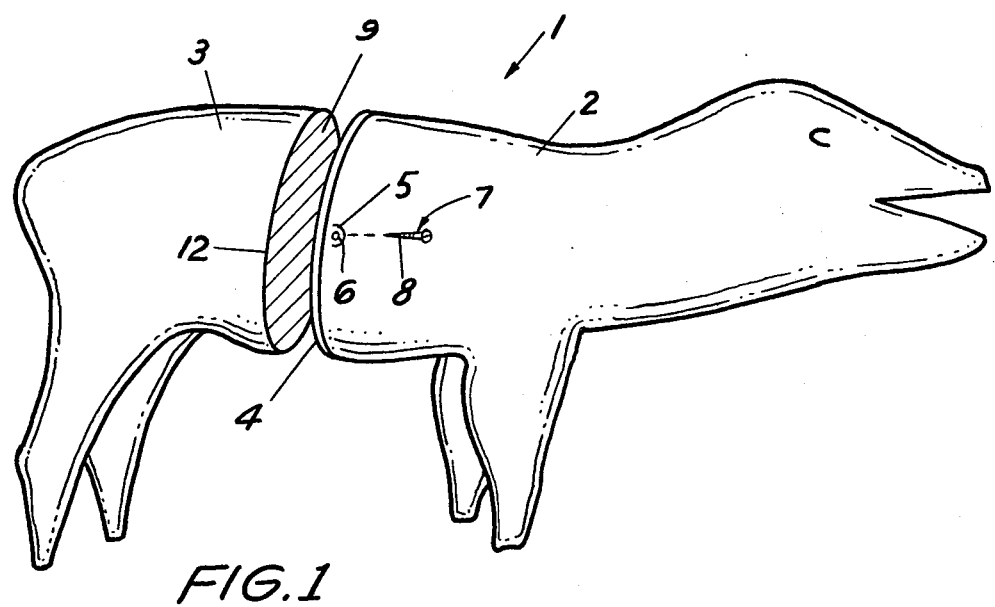
FIG. 1 of the drawing is a perspective view of a typical animal form prepared in two sections and fitted with the joining apparatus of this invention.
Figure 2:
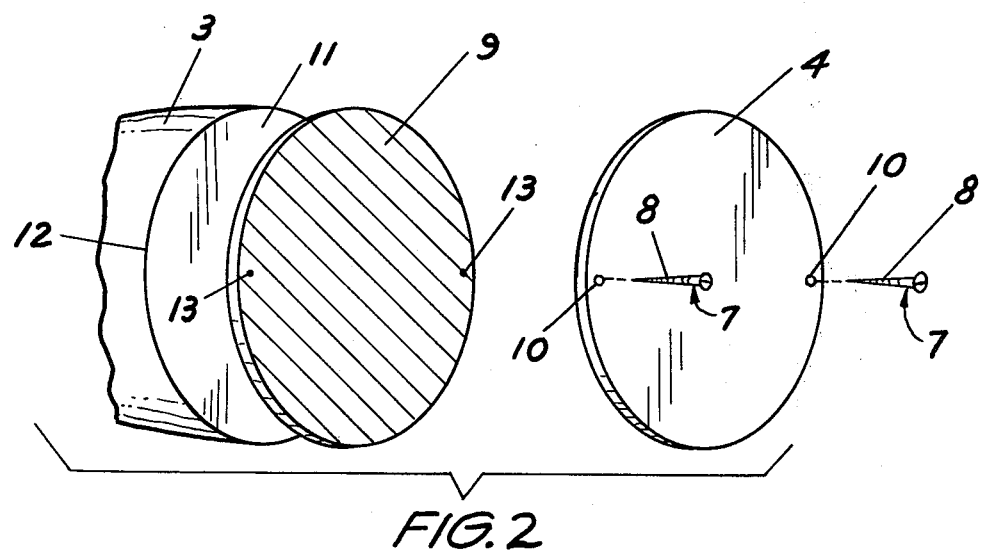
FIG. 2 is an enlarged sectional view of the joining apparatus utilized to achieve a close fit of the two sections.

Referring now to FIGS. 1 and 2 of the drawing, taxidermy form 1 is illustrated in two sections, characterized by forward section 2 and rear section 3. Form 1 is typically formed of polyurethane expanded foam and is generally hollow. Forward anchor plate 4, more particularly illustrated in FIG. 2 of the drawing, is securely positioned inside the hollow core of forward section 2 by glue or epoxy, and is typically formed of plywood. In like manner, rear anchor plate 9 is secured inside rear section cavity 11 of rear section 3, adjacent to and flush with rear section edge 12 of rear section 3. As illustrated, both forward anchor plate 4 and rear anchor plate 9 conform to the configuration of forward section 2 and rear section 3, respectively, and are designed to face and contact each other when forward section 2 and rear section 3 of taxidermy form 1 are fitted together.

As particularly illustrated in FIG. 1 of the drawing, a countersink 5 and countersink screw aperture 6 are provided on both sides of forward section 2 in order to accommodate screws 7, equipped with screw threads 8. Countersink 5 is provided in order to permit depression of screws 7 below the surface of taxidermy form 1 so as not to interfere with the placing of a hide or skin on the form in the mounting operation, and also to provide a smooth mounted surface.

Referring again to FIG. 2 of the drawing, anchor plate screw apertures 10 are provided in forward anchor plate 4 to permit registration of screws 7. As screws 7 are placed in registration with anchor plate screw apertures 10 and forward section 2 is fitted against rear section 3, screw threads 8 are in position to grip rear anchor plate 9 in pilot hole 13, and securely, but removably, join forward anchor plate 4 and rear anchor plate 9.

It will be appreciated by those skilled in the art that alternative means can be used to removably attach forward anchor plate 4 and rear anchor plate 9, and therefore, forward section 2 and rear section 3 of taxidermy form 1. For example, bolts may be used in the place of screws 7, and cooperating nuts may be secured in rear anchor plate 9 in the place of pilot holes 13. Other techniques known to those skilled in the art may also be utilized to join the plates as desired.

It will also be appreciated that countersink 5 and anchor plate screw apertures 10 may be alternatively provided in rear section 3 of taxidermy form 1, and screws 7 screwed into forward anchor plate 4 instead of rear anchor plate 9, by means of screw threads 8. Such positioning is a matter of choice on the part of the manufacturer.

Furthermore, while forward anchor plate 4 and rear anchor plate 9 are preferably formed of plywood from about three-eighths to about three-fourths of an inch thick to facilitate easy joining of the plates together, the plates can be made of other materials as desired. For example, the plates can be molded into the original form and pilot holes drilled or nuts implanted to facilitate joining the front and rear sections by screws or bolts, respectively, as desired.

While taxidermy form 1 is illustrated in two sections, forward section 2 and rear section 3, it will be appreciated that taxidermy form 1 can be divided into as many sections as is expedient for mounting, depending upon the desires of the builder and the size of the animal. Likewise, form 1 can be shaped to accommodate substantially any animal, including birds and fish, as desired.

Having described my invention with the particularity set forth above, what is claimed is:

1. A taxidermy form comprising:
    a. at least two mating sections;
    b. an anchor plate in each of said sections; and
    c. means for securing said anchor plate in one of said sections to said anchor plate in the other of said sections to join said sections.

2. The taxidermy form of claim 1 wherein said at least two sections is a forward section and a rear section.

3. The taxidermy form of claim 1 wherein said anchor plate is a plywood panel formed to fit inside the cross section of each of said sections and fit together in facing relationship when said sections are positioned together.

4. The taxidermy form of claim 1 wherein:
    a. said at least two sections is a forward section and a rear section; and
    b. said anchor plate is a plywood panel formed to fit inside the cross section of each of said forward section and said rear section and fit together in facing relationship when said forward section and said rear section are positioned together.

5. The taxidermy form of claim 1 wherein said means for securing said anchor plate in one of said sections to said anchor plate in the other of said sections is a pair of wood screws.

6. The taxidermy form of claim 1 wherein:
    a. said at least two sections is a forward section and a rear section;
    b. said anchor plate is a plywood panel formed to fit inside the cross section of each of said forward section and said rear section and fit together in facing relationship when said forward section and said rear section are positioned together; and
    c. said means for securing said anchor plate in one of said sections to said anchor plate in the other of said sections is a pair of wood screws.

7. The taxidermy form of claim 1 wherein said means for securing said anchor plate in one of said sections to said anchor plate in the other of said sections is at least one nut positioned in said plate in one of said sections and at least one cooperating bolt positioned in a receiving aperture in said plate in the other of said sections.

8. The taxidermy form of claim 1 wherein:
    a. said at least two sections is a forward section and a rear section;
    b. said anchor plate is a plywood panel formed to fit inside the cross section of each of said forward section and said rear section and fit together in facing relationship when said forward section and said rear section are positioned together; and
    c. said means for securing said anchor plate in one of said sections to said anchor plate in the other of said sections is at least one nut positioned in said plate in one of said sections and at least one cooperating bolt positioned in a receiving aperture in said plate in the other of said sections.

9. The taxidermy form of claim 1 further including a countersink and an aperture in said countersink located in each side of one of said sections to accommodate said means for securing said anchor plate.

10. The taxidermy form of claim 1 wherein:
    a. said at least two sections is a forward section and a rear section;
    b. said anchor plate is a plywood panel formed to fit inside the cross section of each of said forward section and said rear section and fit together in facing relationship when said forward section and said rear section are positioned together; and
    c. said means for securing said anchor plate in said forward section to said anchor plate in said rear section is a pair of wood screws, and further including a countersink and an aperture in said countersink located in each side of said forward section to accommodate said wood screws.

* * * * *